(No Model.)
J. GUSHART.
DEVICE FOR SUPPLYING SALT TO STOCK.
No. 349,843. Patented Sept. 28, 1886.
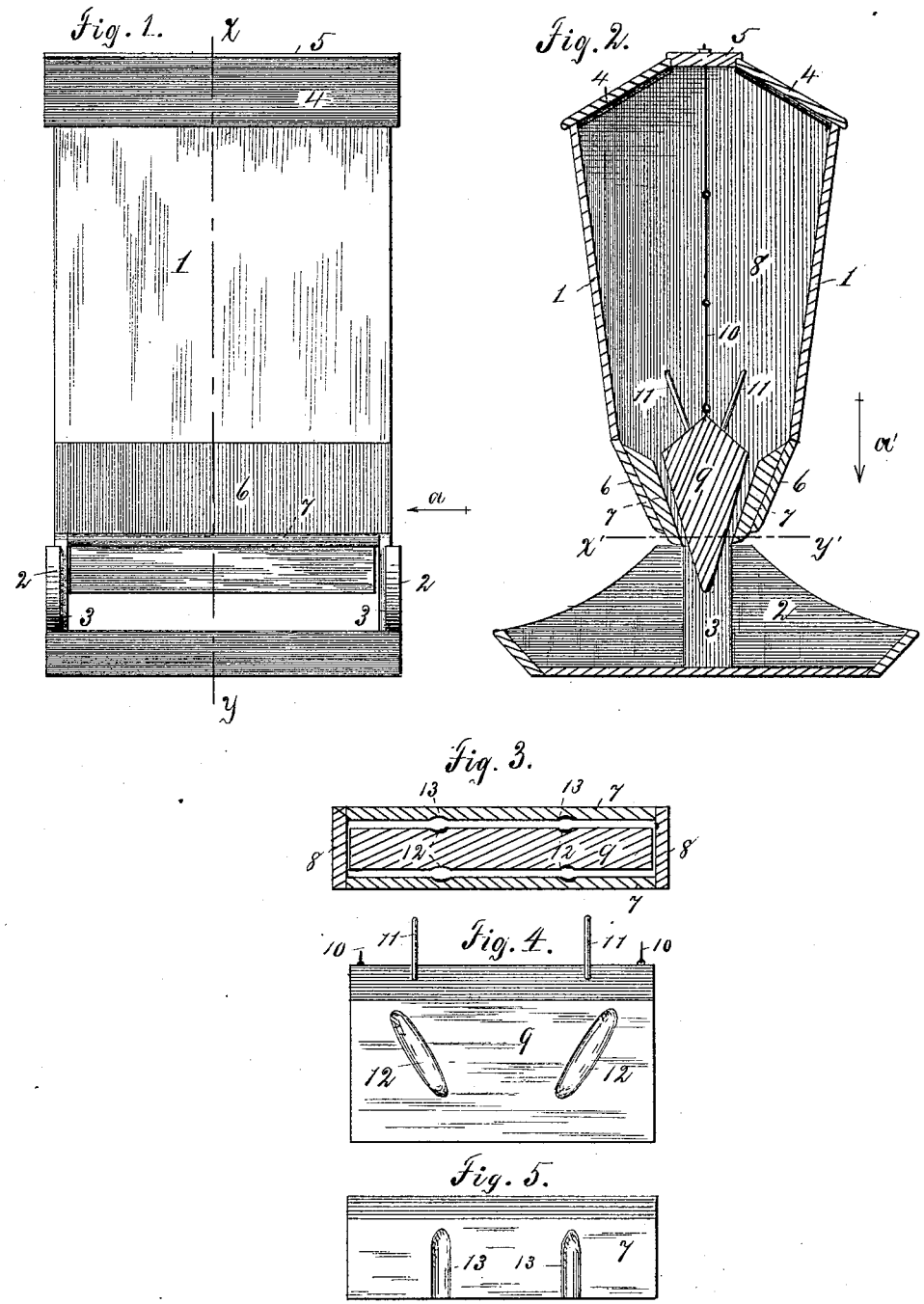

UNITED STATES PATENT OFFICE.

JOHN GUSHART, OF BUCKEYE, ILLINOIS.

DEVICE FOR SUPPLYING SALT TO STOCK.

SPECIFICATION forming part of Letters Patent No. 349,843, dated September 28, 1886.

Application filed March 19, 1886. Serial No. 195,828. (No model.)

*To all whom it may concern:*

Be it known that I, JOHN GUSHART, a resident of Buckeye, in the county of Stephenson and State of Illinois, have invented certain new and useful Improvements in Devices for Supplying Salt to Stock; and I do hereby declare the following to be a full, clear, and exact description of the invention, such as will enable others skilled in the art to which it pertains to make and use the same.

My device consists of a trough supporting over its middle a salt-box of peculiar construction. A wedge-shaped block suspended from the top of the box projects through its bottom, and is adapted to be moved both vertically and horizontally by the action of the tongue of an animal, and by such movement to allow salt to fall from the box to the trough beneath.

In the accompanying drawings, Figure 1 is a side elevation of the complete apparatus. Fig. 2, a section of the same on the line *x y*, Fig. 1, looking in the direction *a*; Fig. 3, a section on the line *x' y'*, Fig. 2, looking in the direction *a'*; Fig. 4, a side elevation of the block above named; and Fig. 5, a side view of a block, 7, Fig. 2, parallel and adjacent to the suspended block 9.

The box 1 being suspended over the middle of a trough, 2, Figs. 1 and 2, constructed as shown, animals may obtain salt therefrom on either side. The box 1 is narrower at the bottom than at the top, the upper portions, 1 1, Fig. 2, sloping slightly and the lower parts, 6, more sharply inward. It has no member that corresponds to the usual bottom of a box, but its sides, together with parts to be explained, support the salt when in operation. Narrow portions 3 of the end walls, 8, of the box extend downward, and are attached upon the interior of the ends 2, Fig. 2, of the trough. A bar, 5, rigidly connects the ends 8 at the top, and is provided with a lip on each upper edge. Sloping covers 4 pass under and are retained, respectively, by these lips, while they rest upon the sides 1, and are prevented from sliding by cleats on their lower surfaces. Blocks 7 narrow the space between the sloping side members, 6, of the box, and leave a rectangular opening, Fig. 3, limited at the ends by the walls 8 of the box. A block, 9, wedge-shaped at top and bottom, is suspended in this opening by a chain, 10, attached to the bar 5 at the top of box, and extends below the box into the space immediately over the middle of the trough. This block is normally so placed that a space is left, Fig. 3, between it and the faces of the blocks 7, and the space so left is a little wider near the upper edge of the inclined faces. By means of a nut upon the chain-rod 10 at its upper extremity the block 9 may be raised or lowered at will, and the space surrounding it be varied to regulate the outflow of salt. Pins 11, Figs. 2 and 4, are rigidly fixed in the upper part of the block 9, and serve to stir or break up the salt in which they lie when the block 9 is agitated. The lower inclined faces of the block 9, Fig. 4, are provided with inclined grooves or depressions 12, and these meet or cross grooves 13, Fig. 5, in the contiguous faces of the blocks 7. If the salt be damp or somewhat compacted after having been damp, the grooves materially facilitate its passage to the trough.

The entire apparatus being symmetrical and having its lateral halves duplicates, it forms in effect two stock-salters, and is especially adapted to serve as two when properly placed on the dividing-line between two inclosures.

The operation of the apparatus is perhaps sufficiently evident from the foregoing description. When the tongue of an animal acts upon the salt-impregnated block 9, the block receives an irregular motion from side to side, combined usually with a slight vertical movement, the pins agitate the salt above the block, and the salt between the blocks 7 and 9 gradually falls into the trough, being ground by the grooved faces, if not already in condition to pass out. When the proper adjustment of the block 9 is once made, the apparatus needs no further attention until the supply of salt is exhausted from the reservoir, for if the trough contain salt the animal neglects the block 9 and it remains stationary, except for an occasional movement imparted accidentally by the nose of the animal. The block 9 may be so adjusted that this accidental motion suffices to keep a supply of salt in the trough at all times.

Having now described and explained my invention, what I claim as new, and desire to secure by Letters Patent, is—

1. In a stock-salter, a receptacle for salt having an opening in its bottom, and a block suspended loosely in said opening and extending below the box or receptacle for salt.

2. In a stock-salter, a salt-receptacle provided with an opening in the form of a vertical wedge, combined with a vertically-adjustable wedge-shaped block suspended in said opening, whereby the passage of salt from the receptacle may be accelerated, retarded, or prevented at will.

3. In a stock-salter, a trough, a salt-receptacle centrally mounted upon and above said trough, and provided with an aperture for the passage of the salt to said trough, and a downwardly-tapering block suspended in said aperture, and adapted to partially or completely close it by vertical adjustment.

4. The trough 2, box 1, and swinging block 9, adjustably supported in an opening in said box, all co-operating substantially as set forth.

5. The trough 2, box 1, grooved block 9, grooved blocks 7, pins 11, and chains 10, supported by the top of said box, combined substantially as shown and described.

In testimony whereof I have signed this specification in the presence of two subscribing witnesses.

JOHN GUSHART.

Witnesses:
 N. W. HARLACHER,
 ALMA RICHART.